Nov. 9, 1943.　　　　G. H. GASCOIGNE　　　　2,333,855
APPLIANCE FOR CUTTING, MIXING, AND MASHING ANIMAL AND POULTRY FOODS
Filed Oct. 26, 1942

Inventor
George H. Gascoigne
By E. F. Wunderoth
Attorney

Patented Nov. 9, 1943

2,333,855

UNITED STATES PATENT OFFICE 2,333,855

APPLIANCE FOR CUTTING, MIXING, AND MASHING ANIMAL AND POULTRY FOODS

George Harry Gascoigne, Wokingham, England

Application October 26, 1942, Serial No. 463,426
In Great Britain October 18, 1941

7 Claims. (Cl. 146—213)

This invention relates to appliances for cutting, mixing and mashing animal and poultry foods especially that composed of kitchen waste, and has for its object to provide an improved tool or appliance for the purpose. Kitchen waste usually consists of widely diverse constituents such as peelings of various kinds, cabbage leaves and stalks, remains of cooked human foods, and the like. This mixture is very difficult to cut and mash with the tools at present in use. Meals of various kinds are frequently added to the kitchen waste, and such additions make the mixing particularly difficult to carry out satisfactorily.

According to the present invention the improved appliance or tool consists of a tool handle and a tool head, four rectangularly disposed arms extending forwardly from the tool head, and a single length of cutting wire looped tensionally around the arms in a plane transverse to the handle axis and held by them near their free ends with freedom to slide transversely thereon to equalize tension in the portions of the loop.

Figure 1:
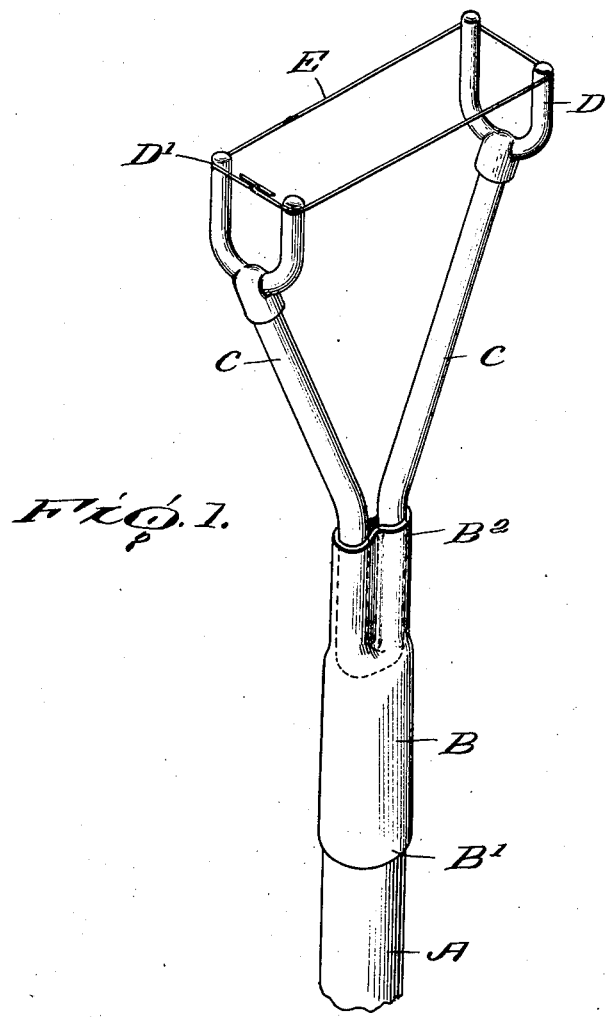
Figure 2:
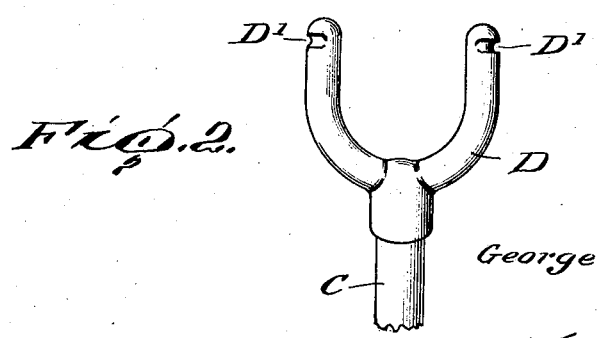

In the accompanying drawing one convenient embodiment of the present invention is illustrated, Figure 1 being a perspective view and Figure 2 an end on elevation of one of the two-forked arms of the tool head shown in Figure 1.

A is a wooden handle fitting into the slightly tapered end $B^1$ of a tubular socket B, the other end $B^2$ of which holds the U-shaped stem of a V-shaped member C. The V-shaped member C is a bar or rod bent upon itself midway in its length to form a stem and two divergent arms each of which has secured thereto a removable two-armed fork or stirrup-piece D so that in effect the tool head has four arms disposed in rectangular relationship, as shown. Each fork D, which is preferably removable from its arm C, has a notch D' on its outer face, and a single length of high tensile steel wire E is looped tensionally around the four arms and engaged in the notches D'. The arms of the member C are forced slightly towards one another to slip the wire rectangle in position and the arms are then relaxed so that the wire is put under tension and maintained taut but can slide transversely on the arms to equalize tension in the portions of the loop.

It is to be noted that the V-shaped member C is secured to the tubular socket B by deforming the corresponding tube end to an oval shape, then inserting the U-shaped stem and then further deforming the tube end to engage and trap the stem as shown in Figure 1.

It will be understood that instead of the notches D' we may provide holes for the wire to pass through.

It will be understood that a tool such as above described will pass with a cutting and mashing action through the food by a downward plunging action while offering minimum resistance and that as the wire lengths advance, the food will roughly close in behind them so that during the upward stroke the lowest portion of the food will become drawn towards the surface and become thoroughly mixed and will become presented efficiently for further cutting and mashing.

What I claim is:

1. A cutting, mixing and mashing appliance consisting of a tool handle, a tool head consisting of a bar bent upon itself midway in its length and having divergent arms each forked at its end, a socket attached to the tool handle and gripping the said bent bar at the bend thereof, and a complete loop of cutting wire embracing and held in tension by the forked ends of the divergent arms of said bar.

2. An appliance according to claim 1 in which each fork of the forked ends is notched to positionally engage the cutting wires.

3. An appliance according to claim 1 in which the socket grips the bent bar at the bend thereof by a local embracing deformation of the socket.

4. A cutting, mixing and mashing appliance or tool for animal and poultry foods, consisting of a tool handle and a tool head, four rectangularly disposed arms extending forwardly from the tool head, and a single length of cutting wire looped tensionally around the arms in a plane transverse to the handle axis and held by them near their free ends with freedom to slide transversely thereon to equalize tension in the portions of the loop.

5. An appliance according to claim 4, the tool head comprising two divergent arms each of which has a two-forked extremity to present the rectangular assembly of four arms.

6. An appliance according to claim 4, the tool head comprising two divergent arms each of which has a two-forked extremity to present the rectangular assembly of four arms, and the two divergent arms being parts of a V-shaped member constituted by a bar having, midway of its length, a U-shaped stem from which said divergent arms extend.

7. A cutting, mixing and mashing appliance or tool for animal or poultry foods, consisting of a tool handle, a tool head, and a tubular socket interconnecting said handle and head, the said head being constituted by a rod having a substantially centrally positioned U-shaped stem with two divergent arms, the said stem being housed in one end of the aforesaid socket, said socket being provided with means to retain said stem therein, and the remote ends of the two divergent arms being forked to present a rectangular assembly of four arms; a single length of cutting wire looped tensionally around the said four arms in a plane transverse to the handle axis and held by them near their free ends with freedom to slide transversely thereon to equalize tension in the portions of the loop.

GEORGE HARRY GASCOIGNE.